United States Patent
Yang (10) Patent No.: US 12,364,214 B2
(45) Date of Patent: Jul. 22, 2025

(54) PREPARATION METHOD FOR ARTIFICIALLY SIMULATED SOIL RICH IN ARTIFICIAL HUMUS MATTER

(71) Applicant: NORTHEAST AGRICULTURAL UNIVERSITY, Harbin (CN)

(72) Inventor: Fan Yang, Harbin (CN)

( * ) Notice: Subject to any disclaimer, the term of this patent is extended or adjusted under 35 U.S.C. 154(b) by 805 days.

(21) Appl. No.: 17/641,947

(22) PCT Filed: Jul. 16, 2020

(86) PCT No.: PCT/CN2020/102245
§ 371 (c)(1),
(2) Date: Oct. 13, 2022

(87) PCT Pub. No.: WO2021/047282
PCT Pub. Date: Mar. 18, 2021

(65) Prior Publication Data
US 2023/0217872 A1     Jul. 13, 2023

(30) Foreign Application Priority Data
Sep. 10, 2019  (CN) .......................... 201910857065.0

(51) Int. Cl.
*A01G 24/22*  (2018.01)
*A01G 24/10*  (2018.01)

(52) U.S. Cl.
CPC ............. *A01G 24/22* (2018.02); *A01G 24/10* (2018.02)

(58) Field of Classification Search
CPC ........ A01G 24/22; A01G 24/10; A01G 24/20; A01G 24/00
See application file for complete search history.

(56) References Cited

FOREIGN PATENT DOCUMENTS

CA           3072258 A1 *  3/2019
CN         102732255 A  * 10/2012

OTHER PUBLICATIONS

Yang, F. et al. "A hydrothermal process to turn waste biomass into artificial fulvic and humic acids for soil remediation" Science of the Total Environment, Issue 686, 2019-06-05, ISSN: 1879-1026.

* cited by examiner

*Primary Examiner* — Anthony J Green
(74) *Attorney, Agent, or Firm* — Novoclaims Patent Services LLC; Mei Lin Wong (57) ABSTRACT

A preparation method for artificially simulated soil rich in humus, relating to a preparation method for simulated soil. The purpose of the method is to solve the problem that the endurance capacity for an existing organic fertilizer to rainwash is low, thereby influencing the effect of remediation on defective soil by the organic fertilizer. The method comprises: 1, preparing a soil mixture; and 2, placing the soil mixture in a high-temperature high-pressure hydrothermal reaction kettle for a hydrothermal reaction to obtain artificially simulated soil rich in humus. The preparation method is simple, raw materials are cheap and easily obtained, and therefore the method is suitable for large-scale synthesis and preparation. The prepared artificially simulated soil rich in humus is used for increasing the soil water retention capacity and the capacity of absorption of nutrients.

10 Claims, 10 Drawing Sheets

PREPARATION METHOD FOR ARTIFICIALLY SIMULATED SOIL RICH IN ARTIFICIAL HUMUS MATTER

FIELD OF INVENTION

The present invention relates to a preparation method of artificially simulated soil.

DESCRIPTION OF RELATED ARTS

Black soil, also known as black soil chernozem, is one of the most fertile soil resources for crop production in the world. The black soil has high organic matter content, fertile soil, and stores thick humus, which is most suitable for farming. In order to feed the growing world population, the black soil has undergone severe degradation over the past few decades. In particular, due to the abuse of pesticides, chemical fertilizers, etc. and the backward restoration system, serious soil erosion and pollution problems have been resulted, barren soil, saline-alkali soil and polluted soil, etc. are gradually formed.

The existing organic fertilizers for different soil problems can solve the problems of soil salinization, serious hardening, poor soil, and declining soil fertility from the aspects of physics, biology and chemistry to a certain extent. However, due to its significant difference in soil structure and composition, the organic fertilizers cannot be perfectly matched to the soil, which increases the risk of being washed by rainwater, and hence affects its restoration effect on problematic soils.

SUMMARY OF THE PRESENT INVENTION

An object of the present invention is to solve the problem that the existing organic fertilizer has low tolerance to rain erosion, which in turn affects its restoration effect on the problem soil, and provides a method for preparing artificially simulated soil rich in humus.

The method for preparing artificially simulated soil rich in humus is carried out by the following steps:

1. Preparation of soil mixture:

Mixing biomass material powder or glucose with a problem soil, then adding alkaline auxiliary agent and distilled water, and stirring evenly to obtain a soil mixture;
   the mass ratio of biomass material powder, problem soil, alkaline auxiliary agent and distilled water in step 1 is (3~5):(0.5~50):(0.3~2):(25~100);
   the mass ratio of glucose, problem soil, alkaline auxiliary agent and distilled water in step 1 is (3~5):(0.5~50):(0.3~2):(25~100);
   the biomass material powder in step 1 is prepared according to the following steps:
   first, washing the biomass material to remove impurities on the surface of the biomass material, then drying the biomass material, and finally, pulverizing the dried biomass material to obtain the biomass material powder.

2. The soil mixture is placed in a high-temperature and high-pressure hydrothermal reactor, then the high-temperature and high-pressure hydrothermal reactor is heated to 180~200° C., then the hydrothermal reaction is carried out for 20 h~28 h under the conditions at a temperature of 180~200° C. and a pressure of 0.5 MPa~5 MPa to obtain a reaction product. The reaction product is centrifuged to obtain solid matter. The solid matter is vacuum-dried to obtain an artificially simulated soil rich in humus.

Principles and Advantages of the Present Invention

1. The present invention uses biomass material and problem soil as raw materials, and adopts a new method of combining hydrothermal humification and thermochemistry to prepare and obtain the artificially simulated soil rich in humus (artificial black soil). The artificial black soil has rich organic matter content, suitable soil acidity and alkalinity, and matches the mineralogy of real black soil. The artificially simulated soil rich in humic substances prepared by the method of the present invention has an appearance similar to that of natural black soil, and the organic matter content can be adjusted to 12.0%~30% according to different target soils. Also, the rich humus is evenly dispersed on the surface of soil minerals, and hence its resistance to rain and surface runoff scouring is increased.

2. Under the action of alkaline auxiliary agent and the reaction conditions of high temperature and high pressure, the glucose, cellulose, hemicellulose and lignin in the biomass material are decomposed and rebonded to form fulvic acid and humic acid. Meanwhile, the alkaline environment in the initial stage of the reaction has a certain activation effect on the mineral surface of the raw soil, which increases the hydroxyl groups on the surface of the soil minerals, hence a matching the sturdy humics-minerals structure is formed through physicochemical action between the humus formed and the mineral surface, and the scour resistance is increased.

3. Biomass materials (such as straw, rice husks, etc.) is a kind of agricultural waste. Because biomass materials are cheap and easy to obtain, the preparation cost of artificial soil is reduced.

4. The present invention combines soil raw materials and biomass materials to simulate a geochemical process to prepare artificial soil rich in organic matter, which can simultaneously increase the content of humus and improve the problems of salinization, fertility decline, and serious pollution of soil raw materials at the same time, and can improve the soil and water conservation capacity of the soil, and increase the soil's ability to absorb nutrients. The artificially simulated soil rich in humus prepared by the present invention has a water-holding capacity equivalent to that of natural black soil, and its adsorption capacity of typical nitrogen, phosphorus and potassium elements are 3~15 times, 1~3 times and 4~20 times of that of the problem soil itself, respectively.

5. The preparation method of the present invention is simple and convenient, and the raw materials are cheap and easy to obtain, so it is suitable for large-scale synthetic preparation.

The artificial simulated soil rich in humus prepared by the present invention is used for increasing soil water-holding capacity and absorbing capacity of nutrient elements.

DETAILED DESCRIPTION OF THE PREFERRED EMBODIMENT

Embodiment 1: According to this embodiment, a method for preparing artificially simulated soil rich in humus is carried out by the following steps:

1. Preparation of soil mixture:

Biomass material powder or glucose is mixed with a problem soil. Then alkaline auxiliary agent and distilled water are added and stirred evenly to obtain a soil mixture.

The mass ratio of biomass material powder, problem soil, alkaline auxiliary agent and distilled water in step 1 is (3~5):(0.5~50):(0.3~2):(25~100).

The mass ratio of glucose, problem soil, alkaline auxiliary agent and distilled water in step 1 is (3~5):(0.5~50):(0.3~2):(25~100).

The biomass material powder in step 1 is prepared according to the following steps:

First, the biomass material is washed to remove impurities on the surface of the biomass material. Then drying is carried out. Finally, the dried biomass material is pulverized to obtain the biomass material powder.

2. The soil mixture is placed in a high-temperature and high-pressure hydrothermal reactor, then the high-temperature and high-pressure hydrothermal reactor is heated to 180~200° C., then the hydrothermal reaction is carried out for 20 h~28 h under the conditions at a temperature of 180~200° C. and a pressure of 0.5 MPa~5 MPa to obtain a reaction product. The reaction product is centrifuged to obtain solid matter. The solid matter is vacuum-dried to obtain an artificially simulated soil rich in humus.

Principles and Advantages of this Embodiment

1. This embodiment uses biomass material and problem soil as raw materials, and adopts a new method of combining hydrothermal humification and thermochemistry to prepare and obtain the artificially simulated soil rich in humus (artificial black soil). The artificial black soil has rich organic matter content, suitable soil acidity and alkalinity, and matches the mineralogy of real black soil. The artificially simulated soil rich in humus prepared by the method of the present invention has an appearance similar to that of natural black soil, and the organic matter content can be adjusted to 12.0%~30% according to different target soils. Also, the rich humus is evenly dispersed on the surface of soil minerals, and hence its resistance to rain and surface runoff scouring is increased.
2. Under the action of alkaline auxiliary agent and the reaction conditions of high temperature and high pressure, the glucose, cellulose, hemicellulose and lignin in the biomass material are decomposed and rebonded to form fulvic acid and humic acid. Meanwhile, the alkaline environment in the initial stage of the reaction has a certain activation effect on the mineral surface of the raw soil, which increases the hydroxyl groups on the surface of the soil minerals, hence a matching the sturdy humics-minerals structure is formed through physicochemical action between the humus formed and the mineral surface, and the scour resistance is increased.
3. Biomass materials (such as straw, rice husks, etc.) is a kind of agricultural waste. Because biomass materials are cheap and easy to obtain, the preparation cost of artificial soil is reduced.
4. This embodiment combines soil raw materials and biomass materials to simulate a geochemical process to prepare artificial soil rich in organic matter, which can simultaneously increase the content of humus and improve the problems of salinization, fertility decline, and serious pollution of soil raw materials at the same time, and can improve the soil and water conservation capacity of the soil, and increase the soil's ability to absorb nutrients. The artificially simulated soil rich in humus prepared by this embodiment has a water-holding capacity equivalent to that of natural black soil, and its adsorption capacity of typical nitrogen, phosphorus and potassium elements are 3~15 times, 1~3 times and 4~20 times of that of the problem soil itself, respectively.

5. The preparation method of this embodiment is simple and convenient, and the raw materials are cheap and easy to obtain, so it is suitable for large-scale synthetic preparation.

The artificial simulated soil rich in humus prepared by this embodiment is used for increasing soil water-holding capacity and absorbing capacity of nutrient elements.

Embodiment 2: The difference between this embodiment and Embodiment 1 is that in step 1, the biomass material is first washed to remove impurities on the surface of the biomass material, and then dried at a temperature of 60° C.~80° C. for 10 h to 24 h. Other steps are the same as in the Embodiment 1.

Embodiment 3: The difference between this embodiment and Embodiment 1 or 2 is that in step 1, the biomass material is one or a mixture of corn stalks, rice husks, leaves and wood chips. Other steps are the same as in the Embodiment 1 or 2.

Embodiment 4: The difference between this embodiment and Embodiments 1-3 is that in step 1, a particle size of the biomass material powder is about 100 meshes to 200 meshes. Other steps are the same as those in the Embodiments 1-3.

Embodiment 5: The difference between this embodiment and Embodiments 1-4 is that in step 1, the problem soil is one or a mixture of desertified soil, heavy metal contaminated soil, organic contaminated soil and saline-alkali soil. Other steps are the same as those in the Embodiments 1-4.

According to this embodiment, in the desertified soil, a mass fraction of sand is ≥80%, soil is ≤10%, and the remainder is plant residues and soil moisture; the heavy metal contaminated soil refers to soil contaminated heavy metal selected from one or more of Pb, Hg, Cu and Zn; organic contaminated soil refers to soil contaminated by organic matter selected by one or more of organic pesticides, petroleum and insecticide.

Embodiment 6: The difference between this embodiment and Embodiments 1-5 is that in step 1, the alkaline auxiliary agent is one or a mixture of NaOH, KOH and Ca(OH)$_2$ and Na$_2$CO$_3$; in the mixture of Ca(OH)$_2$ and Na$_2$CO$_3$; the mass ratio of Ca(OH)$_2$ to Na$_2$CO$_3$ is 1:1. Other steps are the same as those in the Embodiments 1-5.

Embodiment 7: The difference between this embodiment and Embodiments 1-6 is that in step 2, a centrifugation speed is 4000 r/min~12000 r/min. Other steps are the same as those in the Embodiments 1-6.

Embodiment 8: The difference between this embodiment and Embodiments 1-7 is that in step 2, a centrifugation time is 5 min~20 min. Other steps are the same as those in the Embodiments 1-7.

Embodiment 9: The difference between this embodiment and Embodiments 1-8 is that in step 2, a vacuum drying temperature is 60° C.~80° C., and a vacuum drying time is 18 h~24 h. Other steps are the same as those in the Embodiments 1-8.

Embodiment 10: The difference between this embodiment and Embodiments 1-9 is that: in step 2, the soil mixture is placed in a high-temperature and high-pressure hydrothermal reactor, then the high-temperature and high-pressure hydrothermal reactor is heated to 185~195° C., then the hydrothermal reaction is carried out for 22 h~23 h under the conditions at a temperature of 185~195° C. and a pressure of 2 MPa~3 MPa to obtain a reaction product. The reaction product is centrifuged to obtain solid matter. The solid matter is vacuum-dried to obtain an artificially simulated soil rich in humus. Other steps are the same as those in the Embodiments 1-9.

The following examples are employed to verify the beneficial effects of the present invention:

Example 1: A method for preparing artificially simulated soil rich in humus is carried out by the following steps:

1. Preparation of soil mixture:

Mix glucose with desertified soil, then add alkaline auxiliary agent and distilled water, and stir evenly to obtain a soil mixture.

In step 1, a mass ratio of glucose, desertified soil, alkaline auxiliary agent and distilled water in step 1 is 3.24:2.70:1.0:30.

In step 1, the alkaline auxiliary agent is KOH.

In the desertified soil in step 1, a mass fraction of sand is 81%, soil is 10%, and the remainder is plant residues and soil moisture.

2. The soil mixture is placed in a high-temperature and high-pressure hydrothermal reactor, then the high-temperature and high-pressure hydrothermal reactor is heated to 200° C., then the hydrothermal reaction is carried out for 24 h under the conditions at a temperature of 200° C. and a pressure of 3.5 MPa to obtain a reaction product. The reaction product is centrifuged at a centrifugation speed of 6000 r/min for a centrifugation time of 6 min to obtain solid matter. The solid matter is vacuum-dried at a vacuum drying temperature of 70° C. for a vacuum drying time of 20 h to obtain an artificially simulated soil rich in humus.

In the artificially simulated soil rich in humus prepared in Example 1, the organic matter content is 13%.

An adsorption capacity of typical nitrogen, phosphorus and potassium elements of the artificially simulated soil rich in humus prepared in Example 1 are 7.6 times, 1.3 times and 8.8 times of the adsorption capacity of the problem soil itself respectively.

Example 2: A method for preparing artificially simulated soil rich in humus is carried out by the following steps:

1. Preparation of soil mixture:

Mix olive leaves with problem soil, then add alkaline auxiliary agent and distilled water, and stir evenly to obtain a soil mixture.

In step 1, a mass ratio of olive leaves, problem soil, alkaline auxiliary agent and distilled water in step 1 is 4:16.7:1:36.

In step 1, the alkaline auxiliary agent is KOH.

In step 1, the problem soil is desertified soil. In the desertified soil, a mass fraction of sand is 80%, soil is 10%, and the remainder is plant residues and soil moisture.

The biomass material powder in step 1 is prepared according to the following steps:

First, the biomass material is washed to remove impurities on the surface of the biomass material. Then drying at 60° C. for 20 h. Finally, the dried biomass material is pulverized to obtain the biomass material powder. The particle size of the biomass material is 150 mesh.

2. The soil mixture is placed in a high-temperature and high-pressure hydrothermal reactor, then the high-temperature and high-pressure hydrothermal reactor is heated to 200° C., then the hydrothermal reaction is carried out for 24 h under the conditions at a temperature of 200° C. and a pressure of 3.2 MPa to obtain a reaction product. The reaction product is centrifuged at a centrifugation speed of 8000 r/min for a centrifugation time of 10 min to obtain solid matter. The solid matter is vacuum-dried at a vacuum drying temperature of 80° C. for a vacuum drying time of 22 h. to obtain an artificially simulated soil rich in humus.

In the artificially simulated soil rich in humus prepared in Example 2, the organic matter content is 16.7%.

An adsorption capacity of typical nitrogen, phosphorus and potassium elements of the artificially simulated soil rich in humus prepared in Example 2 are 4 times, 1.2 times and 4.3 times of the adsorption capacity of the problem soil itself respectively.

Figure 1:
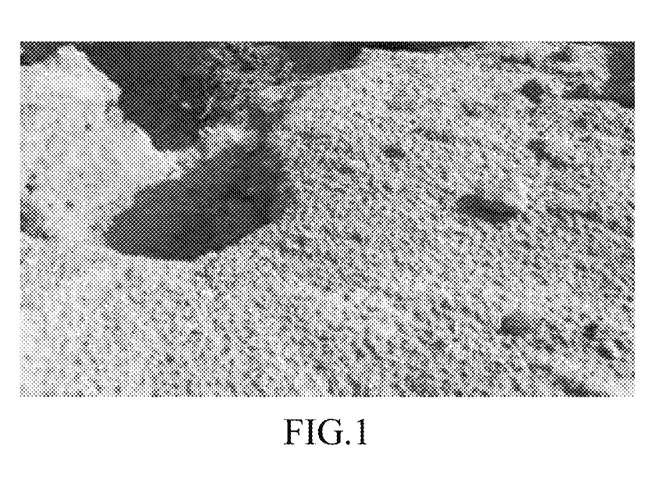
FIG. 1 illustrates a sampling site of desertified soil in Example 1.

FIG. 1 illustrates a sampling site of desertified soil in Example 1.

Figure 2:
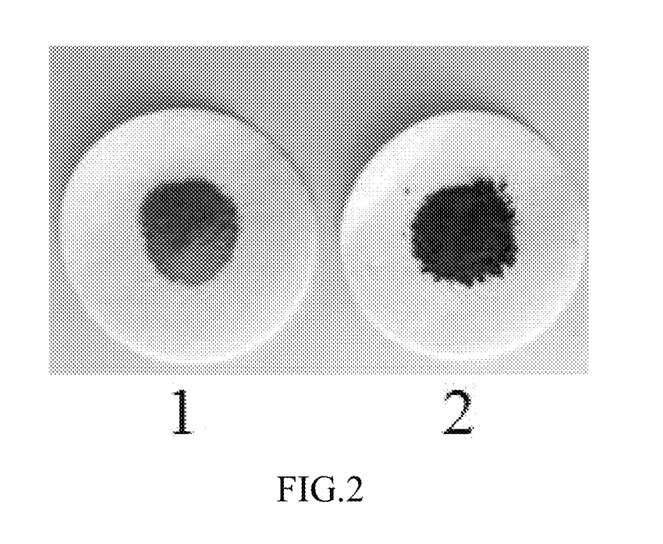
FIG. 2 illustrates a soil comparison photo in Example 1, where 1 refers to desertified soil, 2 refers to the artificially simulated soil rich in humus prepared in Example 1.

FIG. 2 illustrates a soil comparison photo in Example 1, where 1 refers to desertified soil, 2 refers to the artificially simulated soil rich in humus prepared in Example 1.

It can be seen from FIG. 1 and FIG. 2 that, using desertified soil as raw material and adding leaf biomass, the artificially simulated soil rich in humus obtained by the method of Example 1 has an appearance, color and shape similar to those of natural black soil.

Figure 3:
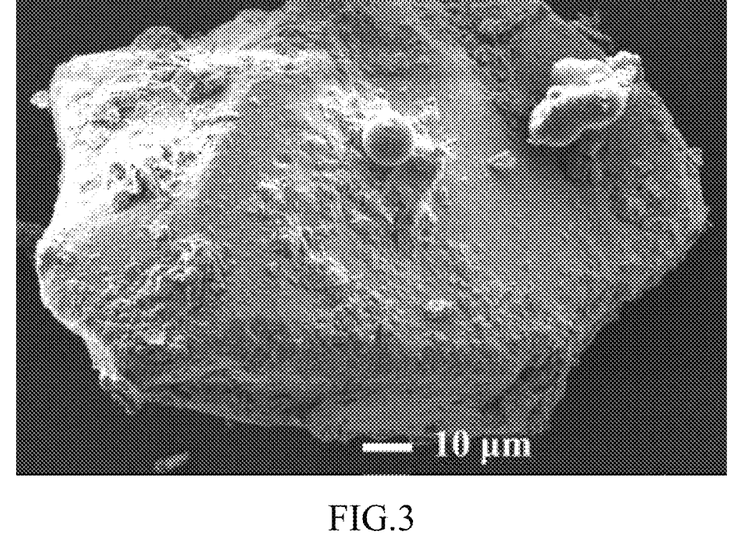
FIG. 3 illustrates a first scanning electron microscope photo of the artificially simulated soil rich in humus prepared in Example 1.

FIG. 3 illustrates a first scanning electron microscope photo of the artificially simulated soil rich in humus prepared in Example 1.

Figure 4:
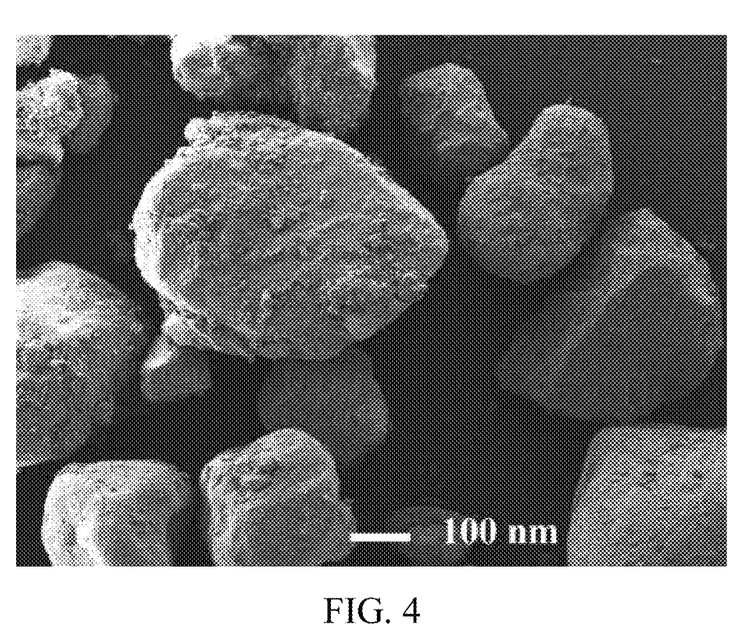
FIG. 4 illustrates a second scanning electron microscope photo of the artificially simulated soil rich in humus prepared in Example 1.

FIG. 4 illustrates a second scanning electron microscope photo of the artificially simulated soil rich in humus prepared in Example 1.

Figure 5:
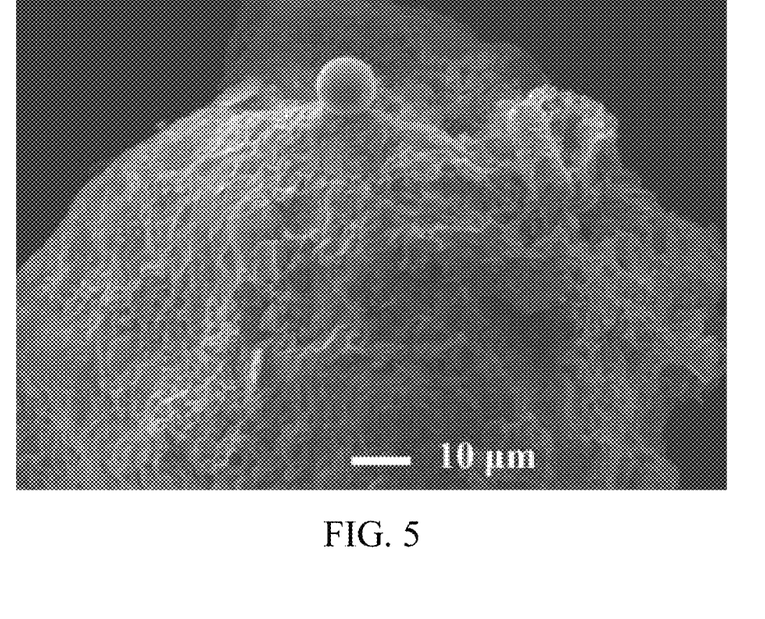
FIG. 5 illustrates a third scanning electron microscope photo of the artificially simulated soil rich in humus prepared in Example 1.

FIG. 5 illustrates a third scanning electron microscope photo of the artificially simulated soil rich in humus prepared in Example 1.

Figure 6:
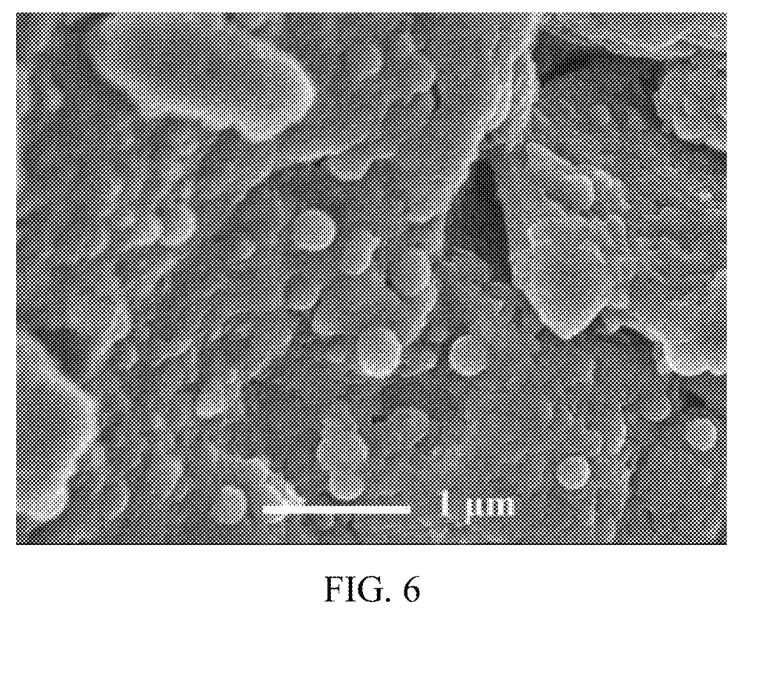
FIG. 6 illustrates a fourth scanning electron microscope photo of the artificially simulated soil rich in humus prepared in Example 1.

FIG. 6 illustrates a fourth scanning electron microscope photo of the artificially simulated soil rich in humus prepared in Example 1.

Figure 7:
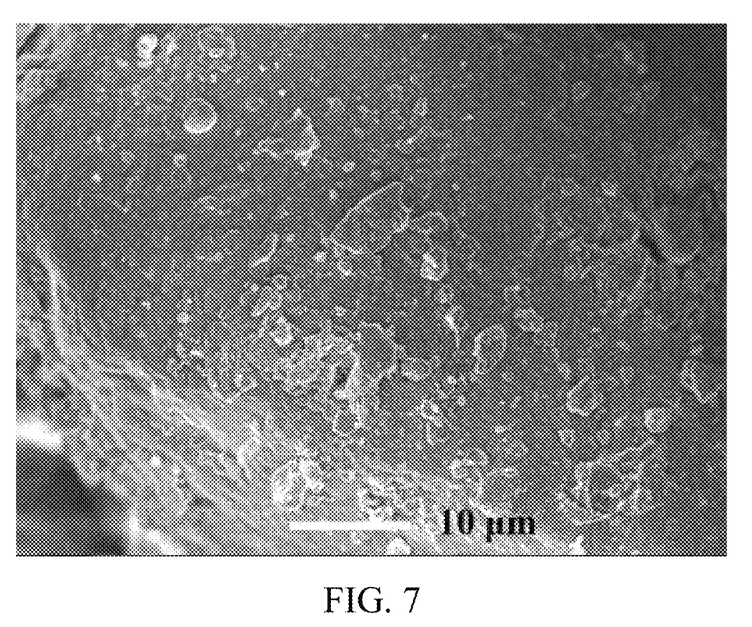
FIG. 7 illustrates a fifth scanning electron microscope photo of the artificially simulated soil rich in humus prepared in Example 1.

FIG. 7 illustrates a fifth scanning electron microscope photo of the artificially simulated soil rich in humus prepared in Example 1.

Figure 8:
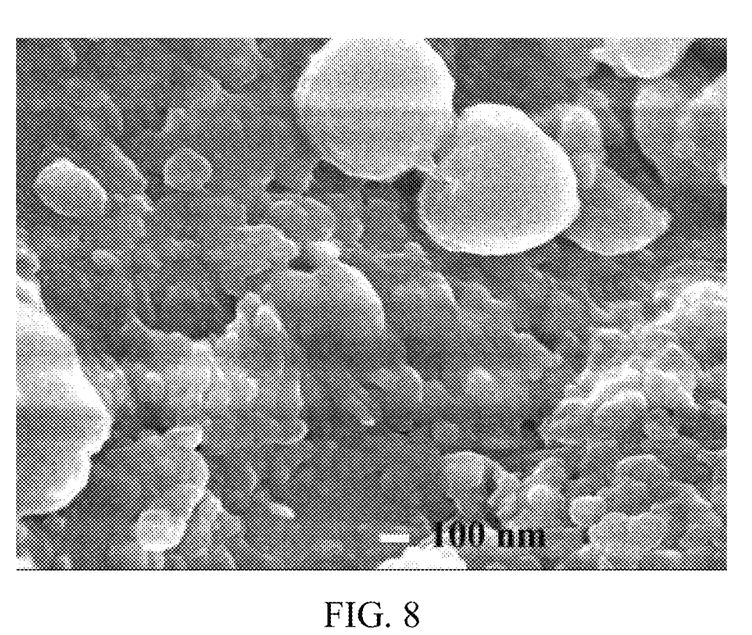
FIG. 8 illustrates a sixth scanning electron microscope photo of the artificially simulated soil rich in humus prepared in Example 1.

FIG. 8 illustrates a sixth scanning electron microscope photo of the artificially simulated soil rich in humus prepared in Example 1.

It can be seen from FIG. 3~FIG. 8 that, using the desertified soil as a raw material and adding glucose, the artificially simulated soil rich in humus obtained by the method of Example 1 has a fibrous structure uniformly distributed on the surface, and has a small amount of spherical structure at the same time. The artificially simulated soil rich in humus obtained by the method of Example 1 has an appearance, color and shape similar to those of natural black soil.

Figure 9:
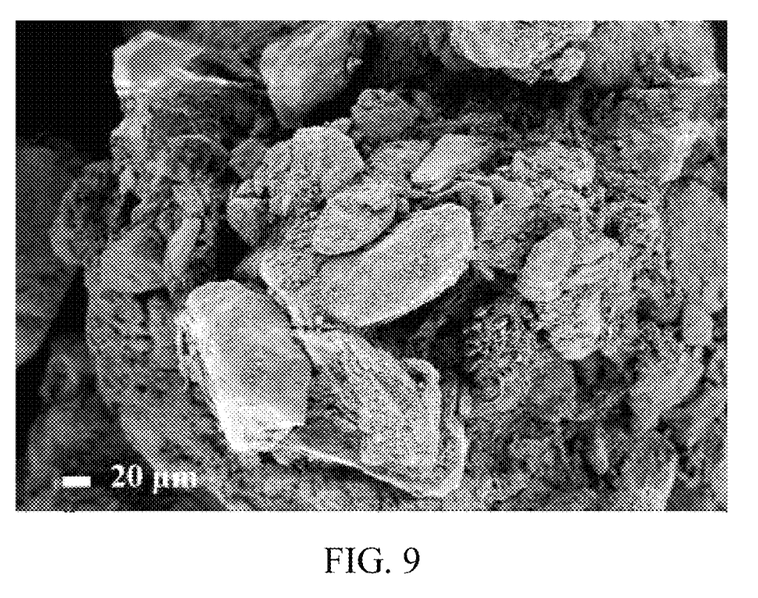
FIG. 9 illustrates a first scanning electron microscope photo of the artificially simulated soil rich in humus prepared in Example 2.

FIG. 9 illustrates a first scanning electron microscope photo of the artificially simulated soil rich in humus prepared in Example 2.

Figure 10:
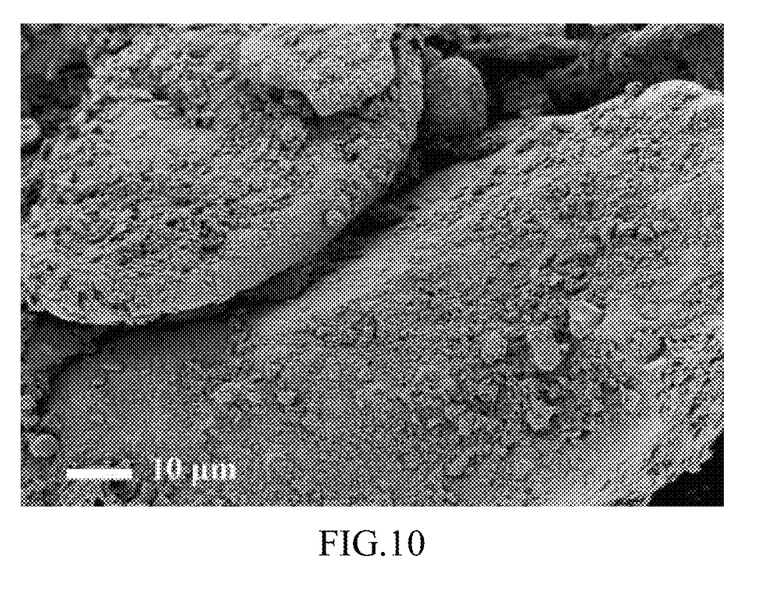
FIG. 10 illustrates a second scanning electron microscope photo of the artificially simulated soil rich in humus prepared in Example 2.

FIG. 10 illustrates a second scanning electron microscope photo of the artificially simulated soil rich in humus prepared in Example 2.

Figure 11:
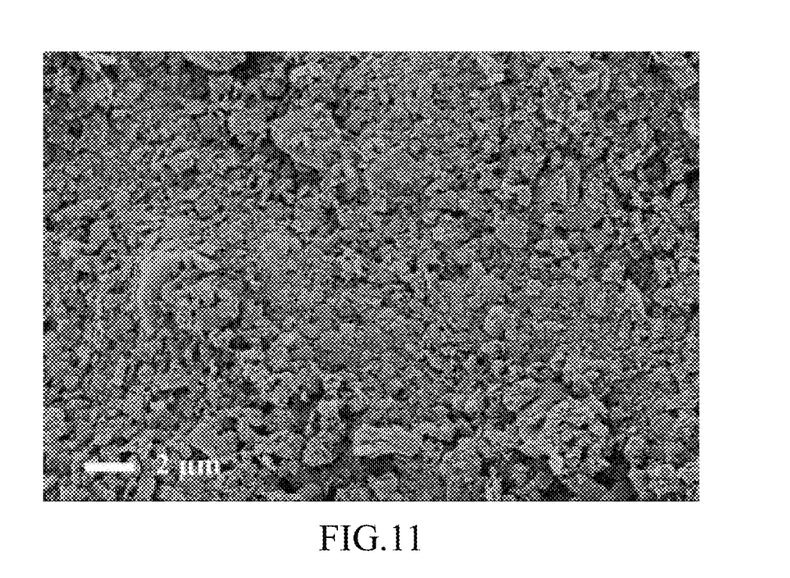
FIG. 11 illustrates a third scanning electron microscope photo of the artificially simulated soil rich in humus prepared in Example 2.

FIG. 11 illustrates a third scanning electron microscope photo of the artificially simulated soil rich in humus prepared in Example 2.

Figure 12:
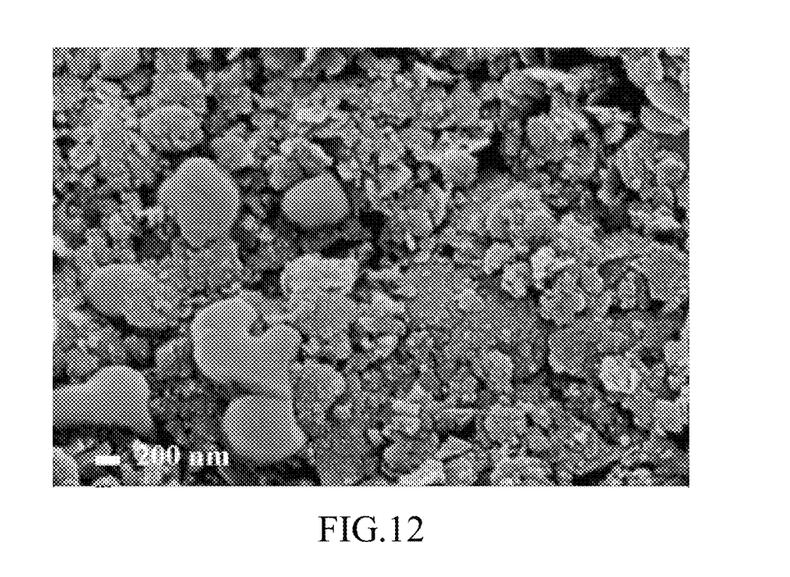
FIG. 12 illustrates a fourth scanning electron microscope photo of the artificially simulated soil rich in humus prepared in Example 2.

FIG. 12 illustrates a fourth scanning electron microscope photo of the artificially simulated soil rich in humus prepared in Example 2.

It can be seen from FIG. 9~FIG. 12 that, using the desertified soil as a raw material and adding olive leaves, the artificially simulated soil rich in humus obtained by the method of Example 2 has a large number of flaky and granular structures with uneven particle size uniformly distributed on the surface, and has a small amount of spherical structure at the same time.

Figure 13:
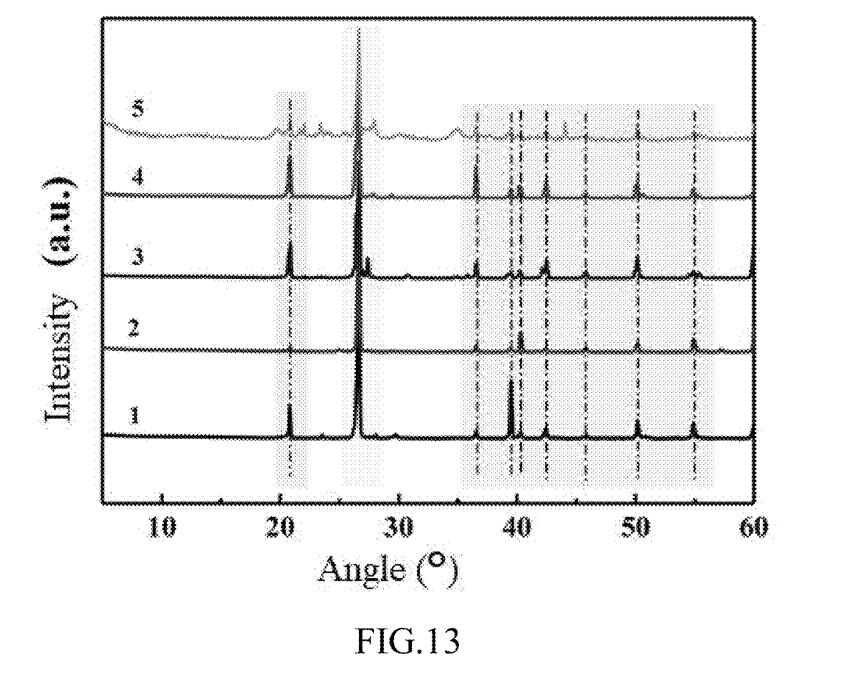
FIG. 13 illustrates an XRD spectrum, wherein 1 refers to the XRD curve of desertified soil, 2 refers to the XRD curve of natural cultivated soil, 3 refers to the XRD curve of the artificially simulated soil rich in humus prepared in Example 1, 4 refers to the XRD curve of the artificially simulated soil rich in humus prepared in Example 2, 5 refers to the XRD curve of natural black soil.

FIG. 13 illustrates an XRD spectrum, wherein 1 refers to the XRD curve of desertified soil, 2 refers to the XRD curve of natural cultivated soil, 3 refers to the XRD curve of the artificially simulated soil rich in humus prepared in Example 1, 4 refers to the XRD curve of the artificially simulated soil rich in humus prepared in Example 2, 5 refers to the XRD curve of natural black soil.

As seen from FIG. 13, the nine peaks at 20.7°, 26.6°, 36.5°, 39.5°, 40.3°, 42.4°, 45.8°, 50.1°, 54.9° occurred in the four XRD curves respectively indicate the existence of silicon dioxide. In addition, the characteristic peaks of various minerals such as $CaCO_3$, $Ca_2(SiO_4)$, $CaMg(Si_2O_6)$, $MgSiO_3$, $Mg_2(Si_2O_6)$, $Mg_2SiO_4$, $Mg(SiO_3)$ and $Mg(SiO_3)$ are also appeared.

Figure 14:
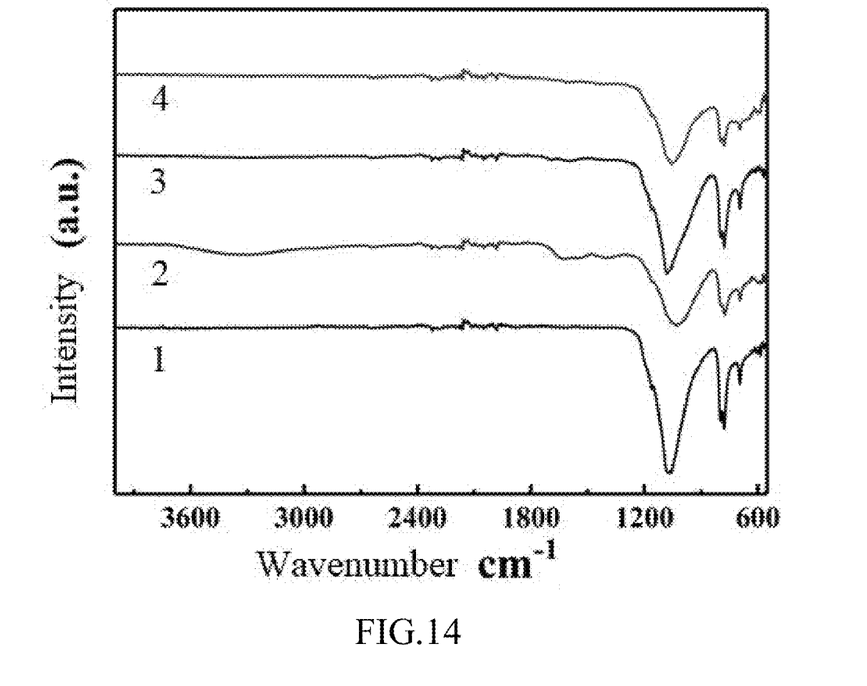
FIG. 14 illustrates an infrared spectrum of the artificially simulated soil rich in humus, wherein 1 refers to the infrared spectrogram of natural black soil, 2 refers to the infrared spectrogram of natural cultivated soil, 3 refers to the infrared spectrogram of the humus-rich artificially simulated soil prepared in Example 1, 4 refers to the infrared spectrogram of the humus-rich artificially simulated soil prepared in Example 2.

FIG. 14 illustrates an infrared spectrum of the artificially simulated soil rich in humus, wherein 1 refers to the infrared spectrogram of natural black soil, 2 refers to the infrared spectrogram of natural cultivated soil, 3 refers to the infrared spectrogram of the humus-rich artificially simulated soil prepared in Example 1, 4 refers to the infrared spectrogram of the humus-rich artificially simulated soil prepared in Example 2.

It can be seen from FIG. 14 that abundant —OH groups are present on the surface of natural black soil. There are two observed absorption peaks at wavenumbers 3357 and 1640~1620 $cm^{-1}$ on the curves of both natural tillage soil and artificial soil. For all the curves, the wavenumbers at 1100-1000, 782, 692 and 600 $cm^{-1}$ have absorption peaks are due to vibrations of C—O, C—H, —OH and/or —$NH_2$ groups.

Figure 15:
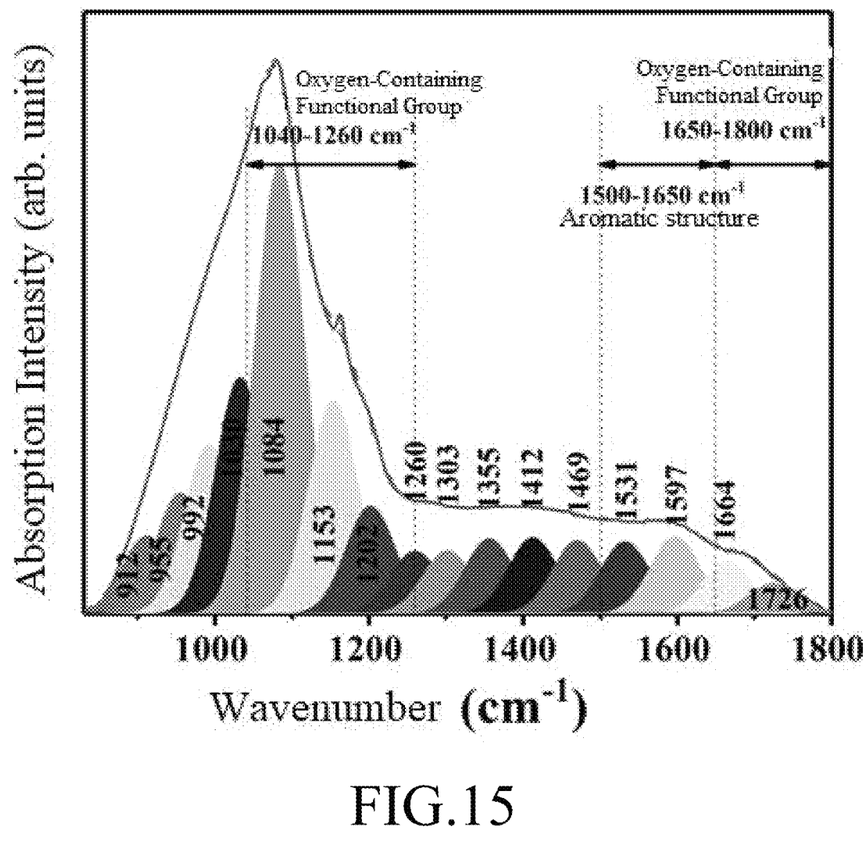
FIG. 15 illustrates an infrared spectrum with peak identification of the artificially simulated soil rich in humus according to Example 1.

FIG. 15 illustrates an infrared spectrum with peak identification of the artificially simulated soil rich in humus according to Example 1.

It can be seen from FIG. 15 that the region with the wavenumber range of 800-1800 $cm^{-1}$ on the infrared spectrum is divided into three peak groups of 1650-1800 $cm^{-1}$, 1500-1650 $cm^{-1}$ and 1040-1260 $cm^{-1}$. By comparing the peak group area ratios of 1650-1800 $cm^{-1}$ and 1500-1650 $cm^{-1}$, the results are 0.35 and 0.34 for desertified soil and the artificially simulated soil rich in humus, which indicates that the level of humus has increased.

Figure 16:
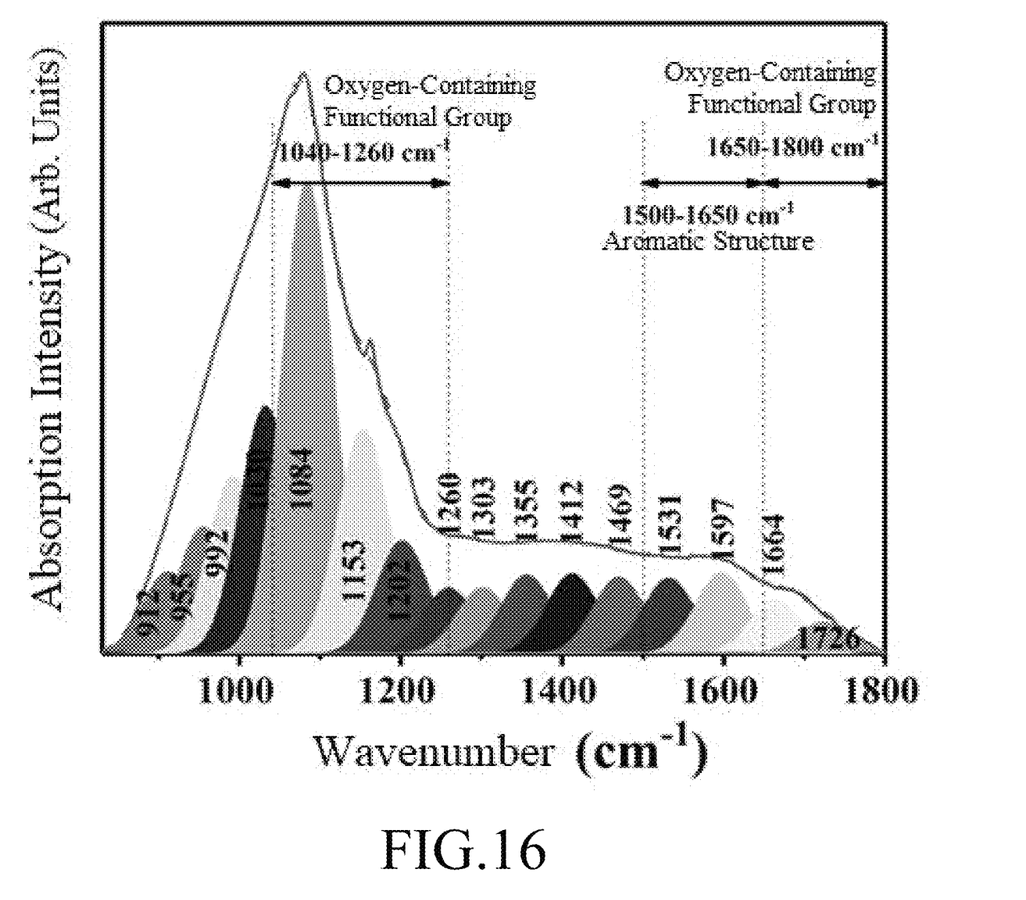
FIG. 16 illustrates an infrared spectrum with peak identification of the artificially simulated soil rich in humus according to Example 2.

FIG. 16 illustrates an infrared spectrum with peak identification of the artificially simulated soil rich in humus according to Example 2.

It can be seen from FIG. 16 that the region with the wavenumber range 800~1800 $cm^{-1}$ on the infrared spectrum is divided into three peak groups of 1650-1800 $cm^{-1}$, 1500-1650 $cm^{-1}$ and 1040-1260 $cm^{-1}$. By comparing the peak group area ratios of 1650-1800 $cm^{-1}$ and 1500-1650 $cm^{-1}$, the results are 0.35 and 0.22 for desertified soil and the artificially simulated soil rich in humus, which indicates that the level of humus has increased.

Figure 17:
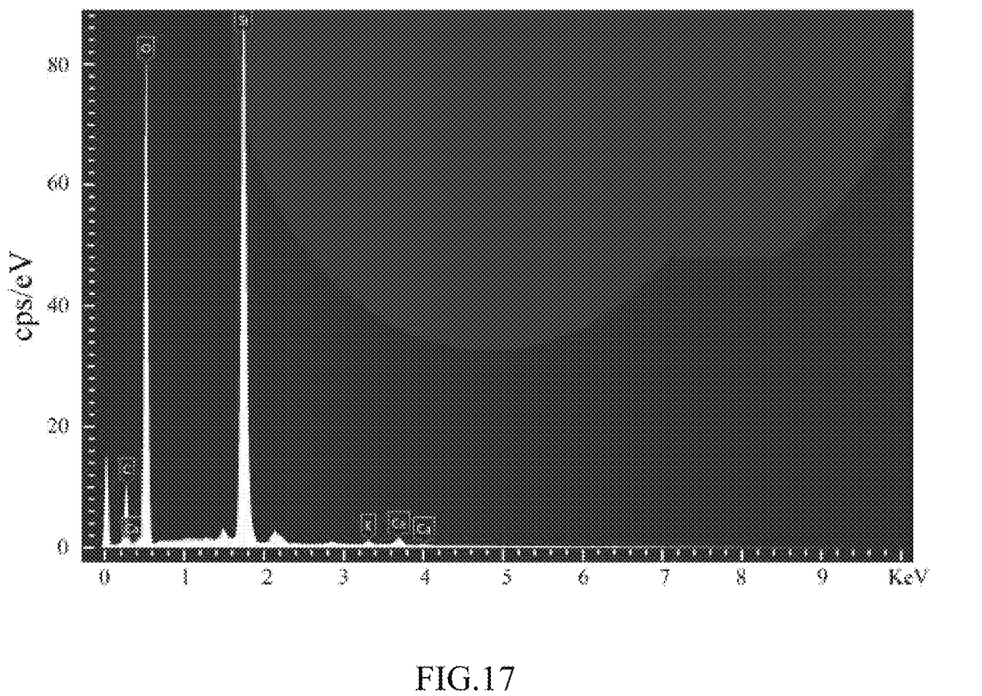
FIG. 17 illustrates an energy dispersive X-ray spectrogram of the artificially simulated soil rich in humus according to Example 2.

FIG. 17 illustrates an energy dispersive X-ray spectrogram of the artificially simulated soil rich in humus according to Example 2.

The data of FIG. 17 is listed in Table 1.

TABLE 1

|    | Wt % | σ |
|----|------|-----|
| O  | 50.4 | 0.3 |
| Si | 29.6 | 0.2 |
| C  | 18.2 | 0.4 |
| Ca | 1.3  | 0.1 |
| K  | 0.6  | 0.1 |

It can be seen from FIG. 17 and Table 1 that, the artificially simulated soil rich in humus prepared in Example 2 contains C, Si, Ca, K and Ca elements, and the existence of these elements comes from the inherent components of the soil.

What is claimed is:

1. A method of preparing artificially simulated soil rich in humus, characterized in that:

(I) Preparation of soil mixture:

mixing biomass material powder or glucose with a problem soil, then adding alkaline auxiliary agent and distilled water, and stirring evenly to obtain a soil mixture;

in step (I), a mass ratio of biomass material powder, problem soil, alkaline auxiliary agent and distilled water in step 1 is (3~5):(0.5~50):(0.3~2):(25~100);

in step (I), a mass ratio of glucose, problem soil, alkaline auxiliary agent and distilled water in step 1 is (3~5):(0.5~50):(0.3~2):(25~100);

the biomass material powder in step 1 is prepared according to the following steps:

first, washing the biomass material to remove impurities on surface of the biomass material, then drying the biomass material, and finally, pulverizing the dried biomass material to obtain the biomass material powder;

(II) placing the soil mixture in a high-temperature and high-pressure hydrothermal reactor, then heating the high-temperature and high-pressure hydrothermal reactor to 180~200° C., then carrying out hydrothermal reaction for 20 h~28 h under the conditions at a temperature of 180~200° C. and a pressure of 0.5 MPa~5 MPa to obtain a reaction product, carrying out centrifugation for the reaction product to obtain solid matter, and vacuum drying the solid matter to obtain an artificially simulated soil rich in humus.

2. The method of preparing artificially simulated soil rich in humus according to claim 1, characterized in that: in step (I), the biomass material is first washed to remove impurities on the surface of the biomass material, and then dried at a temperature of 60° C.~80° C. for 10 h to 24 h.

3. The method of preparing artificially simulated soil rich in humus according to claim 1, characterized in that: in step (I), the biomass material is one or a mixture of corn stalks, rice husks, leaves and wood chips.

4. The method of preparing artificially simulated soil rich in humus according to claim 1, characterized in that: in step (I), a particle size of the biomass material powder is about 100 meshes to 200 meshes.

5. The method of preparing artificially simulated soil rich in humus according to claim 1, characterized in that: in step (I), the problem soil is one or a mixture of desertified soil, heavy metal contaminated soil, organic contaminated soil and saline-alkali soil.

6. The method of preparing artificially simulated soil rich in humus according to claim 1, characterized in that: in step (I), the alkaline auxiliary agent is one or a mixture of NaOH, KOH and $Ca(OH)_2$ and $Na_2CO_3$; in the mixture of $Ca(OH)_2$ and $Na_2CO_3$; the mass ratio of $Ca(OH)_2$ to $Na_2CO_3$ is 1:1.

7. The method of preparing artificially simulated soil rich in humus according to claim 1, characterized in that: in step (II), a centrifugation speed is 4000 r/min~12000 r/min.

8. The method of preparing artificially simulated soil rich in humus according to claim 1, characterized in that: in step (II), a centrifugation time is 5 min~20 min.

9. The method of preparing artificially simulated soil rich in humus according to claim 1, characterized in that: in step (II), a vacuum drying temperature is 60° C.~80° C., and a vacuum drying time is 18 h~24 h.

10. The method of preparing artificially simulated soil rich in humus according to claim 1, characterized in that: in step (II), the soil mixture is placed in a high-temperature and high-pressure hydrothermal reactor, then the high-temperature and high-pressure hydrothermal reactor is heated to 185~195° C., then hydrothermal reaction is carried out for 22 h~23 h under the conditions at a temperature of 185~195° C. and a pressure of 2 MPa~3 MPa to obtain a reaction product, the reaction product is centrifuged to obtain solid matter, the solid matter is vacuum-dried to obtain an artificially simulated soil rich in humus.

* * * * *